United States Patent
Orecher

(10) Patent No.: US 9,305,221 B2
(45) Date of Patent: Apr. 5, 2016

(54) METHOD AND APPARATUS FOR IDENTIFYING A POSSIBLE COLLISION OBJECT

(71) Applicant: Bayerische Motoren Werke Aktiengesellschaft, Munich (DE)

(72) Inventor: Sebastian Orecher, Schoengeising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 99 days.

(21) Appl. No.: 14/082,721

(22) Filed: Nov. 18, 2013

(65) Prior Publication Data

US 2014/0072176 A1 Mar. 13, 2014

Related U.S. Application Data

(63) Continuation of application No. PCT/EP2012/058421, filed on May 8, 2012.

(30) Foreign Application Priority Data

May 19, 2011 (DE) .......................... 10 2011 076 112

(51) Int. Cl.
*G06K 9/00* (2006.01)
*G08G 1/16* (2006.01)

(52) U.S. Cl.
CPC ............ *G06K 9/00805* (2013.01); *G08G 1/166* (2013.01)

(58) Field of Classification Search
CPC ....................................................... G06K 9/00
USPC .......................................................... 382/103
See application file for complete search history.

(56) References Cited

U.S. PATENT DOCUMENTS

| 6,218,960 B1 | 4/2001 | Ishikawa et al. |
| 2005/0212913 A1 | 9/2005 | Richter |

(Continued)

FOREIGN PATENT DOCUMENTS

| DE | 10 2004 015 806 A1 | 10/2005 |
| DE | 10 2005 056 645 A1 | 6/2006 |
| EP | 2 026 246 A1 | 2/2009 |
| EP | 2 081 131 A1 | 7/2009 |
| EP | 2 288 138 A1 | 2/2011 |

OTHER PUBLICATIONS

International Search Report (PCT/ISA/210) dated Sep. 6, 2012 (Three (3) pages).
German Search Report with partial English translation dated Apr. 4, 2012 (Ten (10) pages).
International Preliminary Report on Patentability (PCT/IB/326) and (PCT/IB/373) including Written Opinion (PCT/ISA/237) dated Nov. 28, 2013 with English translation (twenty (20) pages).

*Primary Examiner* — Stephen R Koziol
*Assistant Examiner* — Delomia L Gilliard
(74) *Attorney, Agent, or Firm* — Crowell & Moring LLP

(57) ABSTRACT

An imaging unit is arranged in a motor vehicle. The imaging unit is designed for providing, as a function of an image acquired by it, a digital source image of a predefined image size. A first intermediate image of a predefined first intermediate image size is generated by reducing a resolution of the source image for the sake of reducing pixels. Furthermore, a second intermediate image of the predefined image size is generated such that it comprises the first intermediate image. The second intermediate image is analyzed by a predefined detector in order to examine whether an object of a predefined object category is situated in the second intermediate image, the detector being designed for analyzing a predefined image detail and for detecting an object of a predefined object category of a predefined object size range.

11 Claims, 2 Drawing Sheets

(56) References Cited

U.S. PATENT DOCUMENTS

| | | |
|---|---|---|
| 2006/0115119 A1 | 6/2006 | Nagaoka et al. |
| 2006/0171563 A1 | 8/2006 | Takashima et al. |
| 2008/0063295 A1* | 3/2008 | Hasegawa .................... 382/261 |
| 2009/0002398 A1* | 1/2009 | Goerzen ....................... 345/660 |
| 2009/0060273 A1* | 3/2009 | Stephan et al. ............... 382/103 |
| 2009/0187321 A1* | 7/2009 | Otsuka et al. .................. 701/70 |
| 2012/0081542 A1* | 4/2012 | Suk et al. ...................... 348/139 |

\* cited by examiner

METHOD AND APPARATUS FOR IDENTIFYING A POSSIBLE COLLISION OBJECT

CROSS REFERENCE TO RELATED APPLICATIONS

This application is a continuation of PCT International Application No. PCT/EP2012/058421, filed May 8, 2012, which claims priority under 35 U.S.C. §119 from German Patent Application No. 10 2011 076 112.8, filed May 19, 2011, the entire disclosures of which are herein expressly incorporated by reference.

BACKGROUND AND SUMMARY OF THE INVENTION

The invention relates to a method and a device for detecting a potential collision object in an image, which image is acquired by an imaging unit arranged in a motor vehicle, the imaging unit being designed for providing a digital source image of a predefined image size as a function of the acquired image. The invention further relates to a detection system for a motor vehicle.

When driving at night, a driver's visual range is essentially determined by an illumination of the road by means of front headlights of the vehicle, in which case night vision is frequently temporarily impaired by glare of front headlights of oncoming vehicles. Furthermore, many drivers partially lose their visual function at night. Motor vehicles are therefore increasingly equipped with night vision systems. Night vision systems are typically classified either as passive night vision systems or as active night vision systems. Passive night vision systems acquire infrared ambient light that is emitted by objects. Active systems use, for example, an infrared light source in order to illuminate a predefined area in the forward direction of the vehicle, and process an infrared light reflected by the objects by way of a special camera to form a thermal image. In the predominant number of cases, the acquired thermal images are displayed by a visual output unit, such as a display arranged in the instrument panel, or a head-up display.

It is an object of the invention to provide a method and a device for detecting a potential collision object, as well as a detection system for a motor vehicle, which permit a reliable detection of the potential collision object under various driving and/or traffic conditions for the motor vehicle and contribute to reducing an accident probability of traffic participants.

This and other objects are achieved by a method for detecting a potential collision object in an image, which is acquired by an imaging unit arranged in a motor vehicle. The imaging unit is designed for providing a digital source image of a predefined image size as a function of the acquired image. A first intermediate image of a predefined first intermediate image size is generated by reducing a resolution of the source image for the sake of reducing pixels. A second intermediate image of the predefined image size is generated such that it comprises the first intermediate image. The second intermediate image is analyzed by a predefined detector in order to examine whether an object of a predefined object category is situated in the second intermediate image. The detector is designed for analyzing a predefined image detail and for detecting an object of a predefined object category of a predefined object size range.

According to first and second aspects, the invention is characterized by a method and a corresponding device, for detecting a potential collision object in an image which is acquired by an imaging unit arranged in a motor vehicle. The imaging unit is designed for providing, as a function of the acquired image, a digital source image of a predefined image size. A first intermediate image of a predefined first intermediate image size is generated by reducing a resolution of the source image for the sake of reducing pixels. Furthermore, a second intermediate image of the predefined image size is generated such that it comprises the first intermediate image. The second intermediate image is analyzed by a predefined detector in order to examine whether an object of a predefined object category is situated in the second intermediate image, the detector being designed for analyzing a predefined image detail and for detecting an object of a predefined object category of a predefined object size range.

Within the scope of the invention, a size of a digital image, of a detail of the digital image or of an object in the digital image, is a horizontal and vertical dimension of the digital image, of the detail or of the object within an image plane measured by a number of pixels.

The detector includes, for example, in each case, a descriptor and a classifier that is applied to the descriptor. Here, the descriptor characterizes a characteristic or a group of characteristics in the image detail. By use of the classifier, for example, a confidence interval and/or a probability of a presence of the object in the respective image detail can be determined, and/or a decision can be made as to whether or not the object is contained in the respective image detail. For detecting the object of the predefined object category, the detector is trained, for example, by way of a plurality of example data. This training of the detector may therefore require very high expenditures. A detection performance of the detector may be a function of an object size of the object to be detected. The detector is therefore trained, for example, in such a manner that it reliably detects the object of the predefined object category in an application-specific object size range.

The reduction of the resolution of the source image allows an analysis by means of scaling of the image acquired by the imaging unit, so that the object of the predefined object category may have an object size that may be in the object size range in which the detector can reliably detect the object. An adaptation of the detector, which would otherwise be necessary for a reliable detection of the object in the source image by way of the detector, will not be required. Advantageously, a minimal detection distance, i.e. a minimal distance between a real object and the imaging unit, up to which the object can be reliably detected as a potential collision object, can therefore be predefined as a function of a scaling of the source image.

Advantageously, the second intermediate image has the image size which the source image also has, so that an analysis of the second intermediate image can take place by way of an appropriately designed program routine, which can also be utilized for the analysis of the source image by the predefined detector.

In an advantageous further development, when the object is detected in the second intermediate image, the object can be classified as a potential collision object as a function of a distance of the motor vehicle from the object and/or of a speed of the motor vehicle, and a signal is generated for signaling a predefined warning. This makes it possible to draw the vehicle user's, particularly the driver's, attention to a danger in sufficient time, so that the driver and/or the vehicle can appropriately react for avoiding a collision. The warning may, for example, be signaled by means of an acoustic signal, a visual signal, and/or a haptic signal.

In an advantageous further development, a first pixel value is determined as a function of pixel values of the source image or of the first intermediate image, and remaining pixels of the second intermediate image, which are not comprised by the first intermediate image, have the first pixel value.

In a further advantageous development, the first pixel value is representative of an average value of approximately all pixel values of the source image or of the first intermediate image. This permits a simple and fast determination of the second intermediate image.

In a further advantageous development, the imaging unit is designed for acquiring a thermal image. The imaging unit may, for example, comprise an infrared camera. This advantageously makes it possible that heat-radiating objects, for example, living beings, can be detected especially at night. The predefined object category may comprise specific types of animals and/or persons for this purpose.

In a further advantageous development, the predefined object category comprises predefined types of animals, pedestrians and/or bicyclists who are situated and/or are moving in the edge area of a road and/or on a road, on which the motor vehicle is driving. This makes it advantageously possible that predefined types of animals, pedestrians and/or bicyclists, who are situated and/or are moving in the edge area of the road or on the road, on which the motor vehicle is driving, can be recognized in time.

In a further advantageous development, the resolution of the source image is reduced by a subsampling of the source image. This permits a simple and fast determination of the first intermediate image.

In a further advantageous development, the first intermediate image size is by a predefined factor, which represents a square number, smaller than the image size of the source image. This permits a simple subsampling. Furthermore, a smooth filtering of the source image can be carried out in a very simple manner. For example, an average value can be determined, for example, an arithmetic average, of an image detail out of, for example, a width of 2 pixels and a height of 2 pixels, and this average value forms a new pixel of the first intermediate image. Thus, the smooth filtering and the subsampling can be carried out in one step.

According to a third aspect, the invention is characterized by a detection system for a motor vehicle. The detection system has an imaging unit arranged in the motor vehicle, which imaging unit is designed for providing, as a function of an imaged acquired by it, a digital source image of a predefined image size. Furthermore, the detection system comprises a device arranged in the motor vehicle according to the second aspect for detecting a potential collision object in the image acquired by the imaging unit. Advantageous further developments of the first and second aspect also apply to the third aspect.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
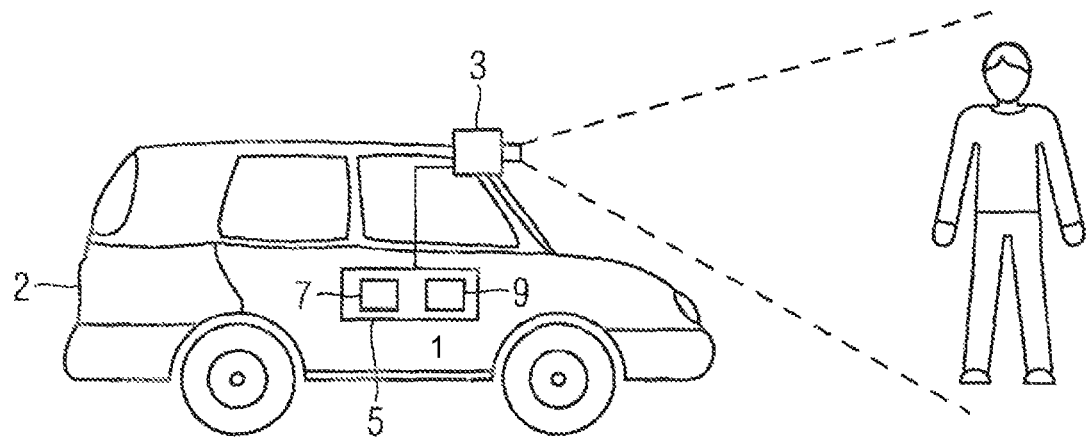
FIG. 1 is a block diagram of a detection system for a motor vehicle.

FIG. 1 is a schematic view of a detection system 1 for a motor vehicle 2. The detection system 1 includes an imaging unit 3 and a control device 5 having an image processing unit 7 and an analyzing unit 9. The control device 5 may also be called a device for detecting a potential collision object. The detection system 1 is, for example, arranged in the motor vehicle 2. The imaging unit 3 may, for example, be arranged in the area of a radiator grille of a motor vehicle and/or in the area of an outside mirror of the vehicle. The detection system 1 preferably includes a night vision system, and the imaging unit 3 is, for example, designed for acquiring a thermal image. The imaging unit 3 may, for example, be an infrared camera.

The imaging unit 3 is preferably arranged in the motor vehicle 2 in such a fashion that it has an acquisition range pointing in the forward direction of the vehicle. The imaging unit 3 is, for example, designed for providing, as a function of an image acquired by it, a digital source image 10 of a predefined image size. The source image 10 is, for example, forwarded to the image processing unit 7 for further processing.

The image processing unit 7 is, for example, designed for analyzing the source image 10 and/or a second intermediate image 30 by way of a predefined detector in order to examine whether an object of a predefined object category is situated in the source image 10 and/or in the second intermediate image 30. The detector may be, for example, on an appropriately programmed processor having a memory.

The analyzing unit 9 is, for example, designed for classifying the object, when it is detected in the source image 10 and/or in the second intermediate image 30, as a function of a distance of the motor vehicle 2 from the object and/or of a speed of the motor vehicle 2, as a potential collision object and for generating a signal for signaling a predefined warning. The analyzing unit 9 is, for example, designed for determining, as a function of detection data of the image processing unit 7, a probability of a collision with another traffic participant and/or another object, and, if necessary, causing the output of warning signals and/or activating safety units of the motor vehicle 2 in a suitable manner. For this purpose, for example, data can be utilized which are determined with respect to the own motor vehicle 2, for example, by a tachograph. Thus, a probability of a collision with another traffic participant and/or the other object can be determined. If, for example, the probability exceeds a predefined threshold value, the signal is generated for signaling a predefined warning. As an alternative or in addition, the classification of an object as a potential collision object can take place as a function of a steering angle and/or of a yaw rate of the motor vehicle 2.

The detector is, for example, designed for analyzing a predefined image detail of the source image 10 and/or of the second intermediate image 30 and detecting the object of the predefined object category with a predefined object size range.

The predefined object category may, for example, include predefined types of animals, pedestrians and/or bicyclists who are situated and/or are moving in the edge area of a road and/or on a road, on which the motor vehicle 2 is driving. In the embodiments illustrated in FIGS. 1 to 4, the object category includes persons who are situated and/or are moving in the edge area of the road and/or on a road, on which the motor vehicle 2 is driving.

For detecting a potential collision object in the image acquired by the imaging unit 3, for example, the source image 10 provided by the imaging unit 3 can be analyzed. For analyzing the source image 10, for example, a plurality of image details, which each have a predefined detail size and a predefined position in the source image 10, are analyzed by way of the detector. The positions in the source image 10 may, for example, have a predefined distance from one another.

As an alternative or in addition, the second intermediate image 30 can be analyzed for detecting the potential collision object in the image acquired by the imaging unit 3. For this purpose, a first intermediate image 20 of a predefined first intermediate image size is generated by reducing the resolution of the source image 10 in terms of reducing the number of pixels. The second intermediate image 30 of the predefined image size is generated such that it includes the first intermediate image 20. The second intermediate image 30 is analyzed by way of the detector analogous to the source image 10. This means that the number of details that are analyzed is identical in each case, and the detail size as well as the positions of the image detail are identical.

Remaining pixels of the second intermediate image 30, which are not comprised by the first intermediate image 20, may, for example, have a first pixel value which is determined as a function of pixel values of the source image 10 or of the first intermediate image 20. The first pixel value may, for example, be representative of an average value of approximately all pixel values of the source image 10 or of the first intermediate image 20.

The resolution of the source image 10 is, for example, reduced by a subsampling of the source image 10. The first intermediate image size is, for example, smaller than the image size of the source image 10 by a predefined factor, which represents a square number. The factor may, for example, have the value 4.

As a function of an imaging scale of the imaging unit 3, the object in the source image 10 may have an image-related object size which depends on a distance of the imaging unit 3 from a real object that is imaged as the object in the source image 10. The detection system 1 is, for example, designed such that, when the source image 10 is analyzed by the detector, persons are reliably detected at a distance from the imagining unit 3 in the forward direction of the vehicle of maximally 100 m to minimally 13 m. In this context, the imaging unit 3 may, for example, be designed such that the object, for example, a person of average size, who is running on the road at a distance of approximately 13 m from the imaging unit 3, is imaged in this source image 10 with an object height of approximately 100 pixels in the direction of a vertical axis y of the source image 10. In this context, the detector may, for example, be designed such that it can detect the predefined object when the object does not exceed the object height of maximally 100 pixels in the direction of the vertical axis y.

For the detection system 1, it may be provided that a predefined warning system is emitted as a function of a remaining reaction time period up to a potential collision of the vehicle with the object. For example, it may be provided that a first warning signal is given when the remaining reaction time period amounts to approximately 2 seconds, and a second warning signal is given when the remaining reaction time period amounts to approximately 1.4 seconds. The first warning signal may, for example, be given such that it is perceived as a preliminary warning by a vehicle driver and/or vehicle occupant. The second warning signal may, for example, be given such that it is perceived as an acute warning by a vehicle driver and/or vehicle occupant.

Because of a minimal detection distance up to which the object is reliably detected, the first warning signal can be generated only starting from a first minimal speed of the motor vehicle 2. The minimal detection distance is, for example, 13 m when the source image 10 is analyzed by the detector. In the case of a remaining reaction time period of 2 seconds, this results in a first minimal speed of 23 km/h. When the motor vehicle 2 falls below this first minimal speed, no first warning signal will be given. Analogously, in this case, at the minimal detection distance of 13 m, the second warning signal is generated only starting from a second minimal speed of the motor vehicle 2 of approximately 33 km/h. When the motor vehicle 2 falls below this second minimal speed, no second warning signal will be given.

By means of an analysis of the second intermediate image 30 by the detector, the minimal detection distance can be reduced. The resolution of the source image 10 can, for example, in each case be reduced to half in the vertical direction and in the horizontal direction, so that the object which, in the source image 10 has, for example, the image-related object height of 200 pixels in the direction of the vertical axis and therefore, in the second intermediate image 30, has the image-related object height of 100 pixels, can be detected by the detector. Thus, the minimal detection distance can, for example, be reduced to approximately 6.5 m. Therefore, in a speed range of above 11.5 km/h, a first warning signal can already be given, and above approximately 16.5 km/h, the second warning signal can be given. This can contribute to increasing the traffic safety of traffic participants, particularly in regions and/or urban areas in Asia, for example, in China, in which motor vehicles 2 are on average driven more slowly than in Europe and in the U.S., and/or in which people are accustomed to crossing a street at shorter distances in front of a motor vehicle 2.

Figure 2:
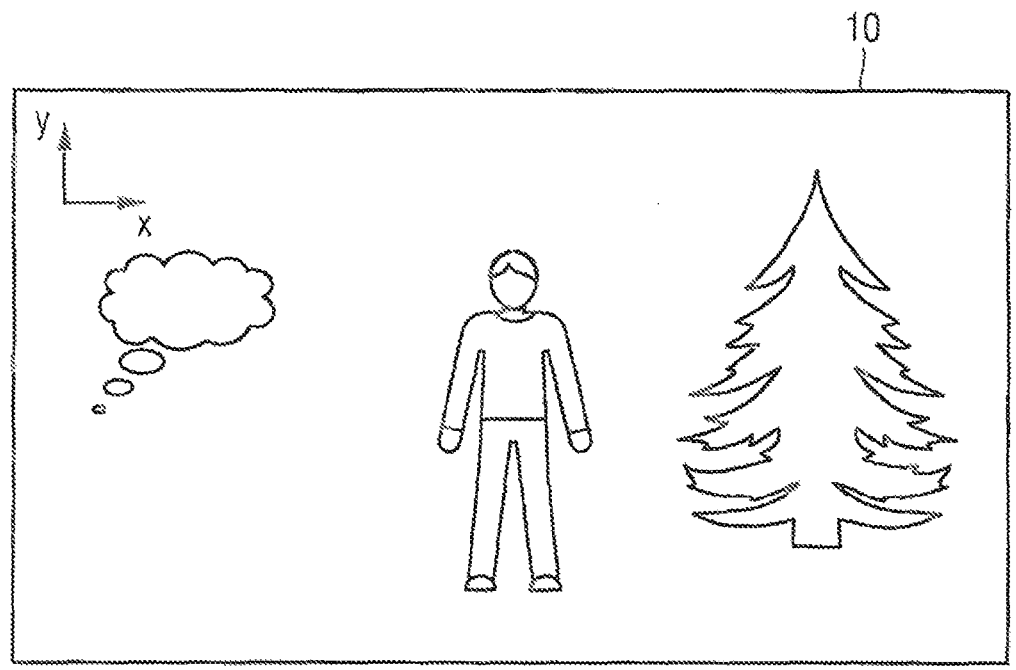
FIG. 2 is a view of an embodiment of a source image with an object of a predefined object category, which has a first object size.

FIG. 2 illustrates an embodiment of a source image 10 with one of the objects of the predefined object category. The object has a first object size. The object is, for example, a person. The source image 10 has a predefined image size, for example, in each case, approximately 400 pixels in the direction of a horizontal axis x and, in each case, approximately 230 pixels in the direction of the vertical axis y. As an example, the person has a maximal object height of 100 pixels in the direction of the vertical axis y and can therefore be reliably detected in the source image 10 by the detector described above as an example.

Figure 3:
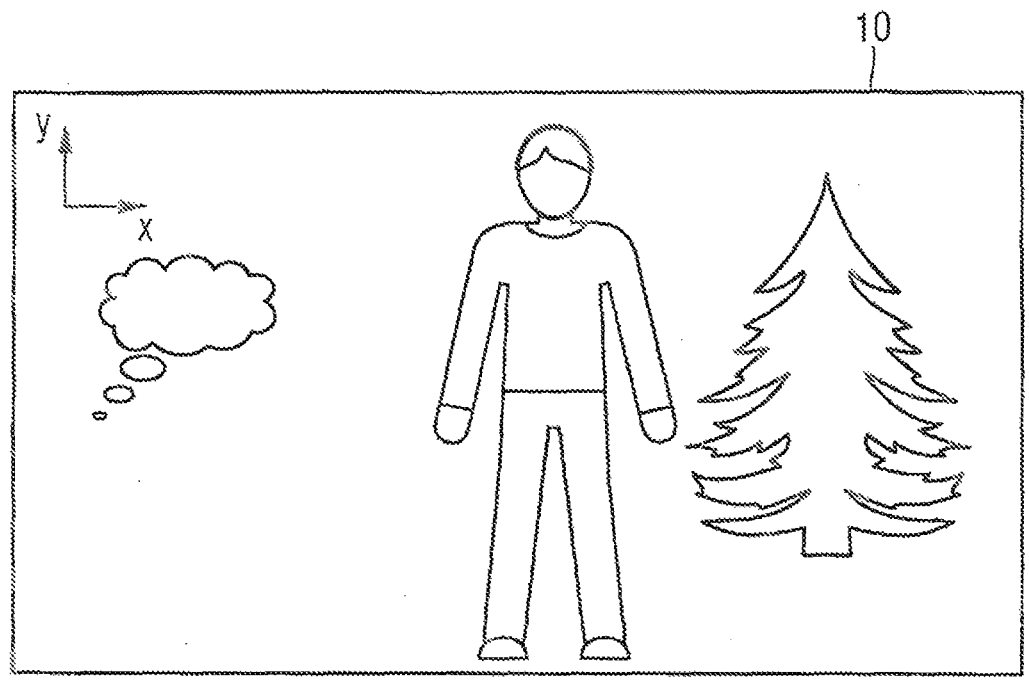
FIG. 3 is a view of a further embodiment of the source image with an object of the predefined object category, which has a second object size.

FIG. 3 illustrates a further embodiment of the source image 10 with one of the objects of the predefined object category. The object has a second object size. The object is, for example, a person. The source image 10 has the predefined image size, for example, in each case, approximately 400 pixels in the direction of a horizontal axis x and, in each case, approximately 230 pixels in the direction of the vertical axis y. The object, in this case, the person has, for example, a maximal object height of 200 pixels in the direction of the vertical axis y and can therefore not be reliably detected in the source image 10 by the detector described above as an example.

Figure 4:
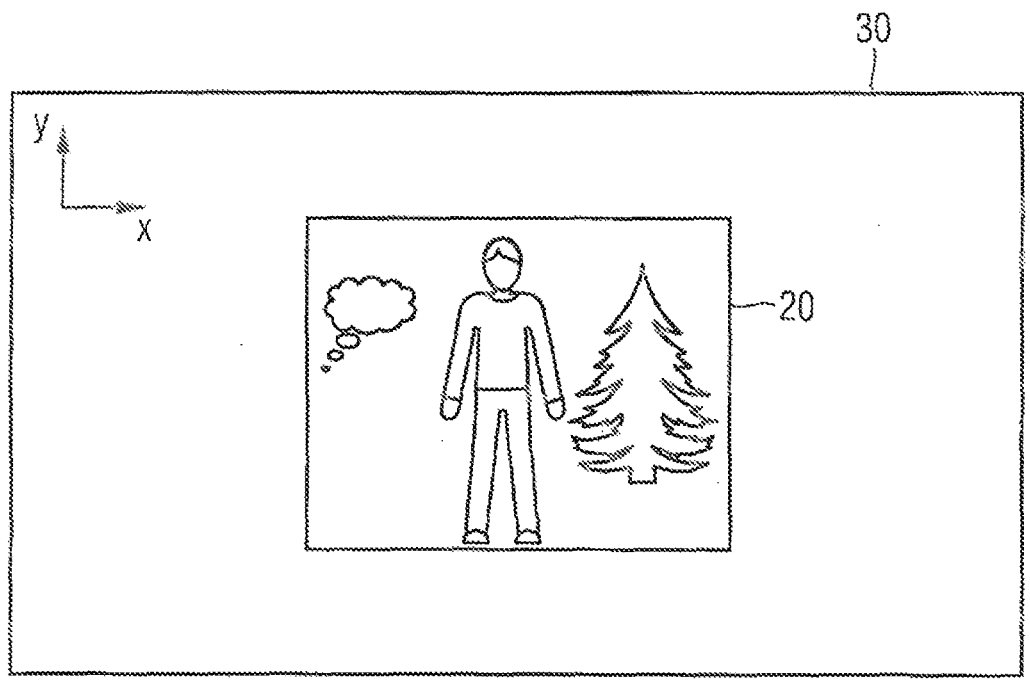
FIG. 4 is a view of a second intermediate image.

FIG. 4 illustrates the second intermediate image 30, which corresponds to the further embodiment of the source image 10 shown in FIG. 3. The second intermediate image 30 has the image size of the source image 10 and comprises the first intermediate image 20. The remaining pixels of the second intermediate image 30, which are not comprised by the first intermediate image 10, have the first pixel value, which represents, for example, the arithmetic average value of approximately all pixel values of the further source image 10. The first intermediate image size is smaller than the image size of the source image 10 by a factor of 4. In the second intermediate image 30, the object, in this case the person, has a maximal object height of 100 pixels in the direction of the vertical axis y and can therefore be reliably detected in the second intermediate image 30 by the detector described above as an example.

LIST OF REFERENCE SYMBOLS

1 Detection system
2 Motor vehicle
3 Imaging unit
5 Control device
7 Image processing unit
9 Analyzing unit
10 Source image
20 First intermediate image
30 Second intermediate image
x Horizontal axis
y Vertical axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting a potential collision object in an image, the method comprising the acts of:
    acquiring, by a camera arranged in a motor vehicle, the image;
    providing, by the camera, a digital source image of a predefined image size as a function of the acquired image;
    generating a first intermediate image of a predefined first intermediate image size by reducing a resolution of the digital source image in a sense of reducing pixels;
    generating a second intermediate image of the predefined image size based on the first intermediate image, the generated second intermediate image including both the first intermediate image and additional pixels not included in the first intermediate image;
    analyzing, via a detector, the second intermediate image to determine whether an object of a predefined object category is located in the second intermediate image, wherein the detector analyzes a predefined image detail and detects the object of the predefined object category of a predefined object size range,
    wherein a first pixel value is determined as a function of pixel values of the digital source image or of the first intermediate image, and the additional pixels of the second intermediate image, which are not included within the first intermediate image, have the first pixel value.

2. The method according to claim 1, further comprising the act of:
    when the object is detected in the second intermediate image, classifying the object as a potential collision object as a function of at least one of a distance of the motor vehicle from the object and of a speed of the motor vehicle; and
    generating a signal to provide a predefined warning of the potential collision object.

3. The method according to claim 1, wherein the first pixel value is representative of an average value of approximately all pixel values of the digital source image or of the first intermediate image.

4. The method according to claim 2, wherein the first pixel value is representative of an average value of approximately all pixel values of the digital source image or of the first intermediate image.

5. The method according to claim 1, wherein the camera acquires a thermal image.

6. The method according to claim 1, wherein the predefined object category comprises predefined types of animals, pedestrians and/or bicyclists located in an edge area of, or on, a road on which the motor vehicle is moving.

7. The method according to claim 6, wherein the predefined types of animals, pedestrians and/or bicyclists are those moving in the edge area of, or on, the road.

8. The method according to claim 1, wherein the act of generating the first intermediate image is carried out by a subsampling of the digital source image in order to reduce the resolution of the digital source image.

9. The method according to claim 1, wherein the first intermediate image size is less than an image size of the digital source image by a predefined factor, which predefined factor represents a square number.

10. A device for detecting a potential collision object in an image acquired by a camera arranged in a motor vehicle and being configured to provide a digital source image of a predefined image size as a function of the acquired image, the device comprising:
    a processor and a computer readable medium, the computer readable medium having stored thereon program code segments that
    generate a first intermediate image of a predefined first intermediate image size by reducing a resolution of the digital source image in a sense of reducing pixels;
    generate a second intermediate image of the predefined image size based on the first intermediate image, wherein the second intermediate image includes both the first intermediate image and additional pixels not included in the first intermediate image; and
    analyzes the second intermediate image to determine whether an object of a predefined object category is located in the second intermediate image wherein the analyzing is carried out by analyzing a predefined image detail so as to detect an object of a predefined object category of a predefined object size range,
    wherein a first pixel value is determined as a function of pixel values of the digital source image or of the first intermediate image, and the additional pixels of the second intermediate image, which are not included within the first intermediate image, have the first pixel value.

11. A system for a motor vehicle, comprising:
    a camera arranged in the motor vehicle, the camera being operatively configured to provide, as a function of an image acquired by the camera, a digital source image of a predefined image size;
    a processor and a computer readable medium, the computer readable medium having stored thereon program code segments that
    generate a first intermediate image of a predefined first intermediate image size by reducing a resolution of the digital source image in a sense of reducing pixels;
    generate a second intermediate image of the predefined image size based on the first intermediate image, wherein the second intermediate image includes both the first intermediate image and additional pixels not included in the first intermediate image; and
    analyzes the second intermediate image to determine whether an object of a predefined object category is located in the second intermediate image wherein the analyzing is carried out by analyzing a predefined image detail so as to detect an object of a predefined object category of a predefined object size range,
wherein a first pixel value is determined as a function of pixel values of the digital source image or of the first intermediate image, and the additional pixels of the second intermediate image, which are not included within the first intermediate image, have the first pixel value.

* * * * *